Sept. 22, 1959 R. C. KOCH 2,905,222
TIRE CHAFER
Filed Aug. 9, 1955 2 Sheets-Sheet 1
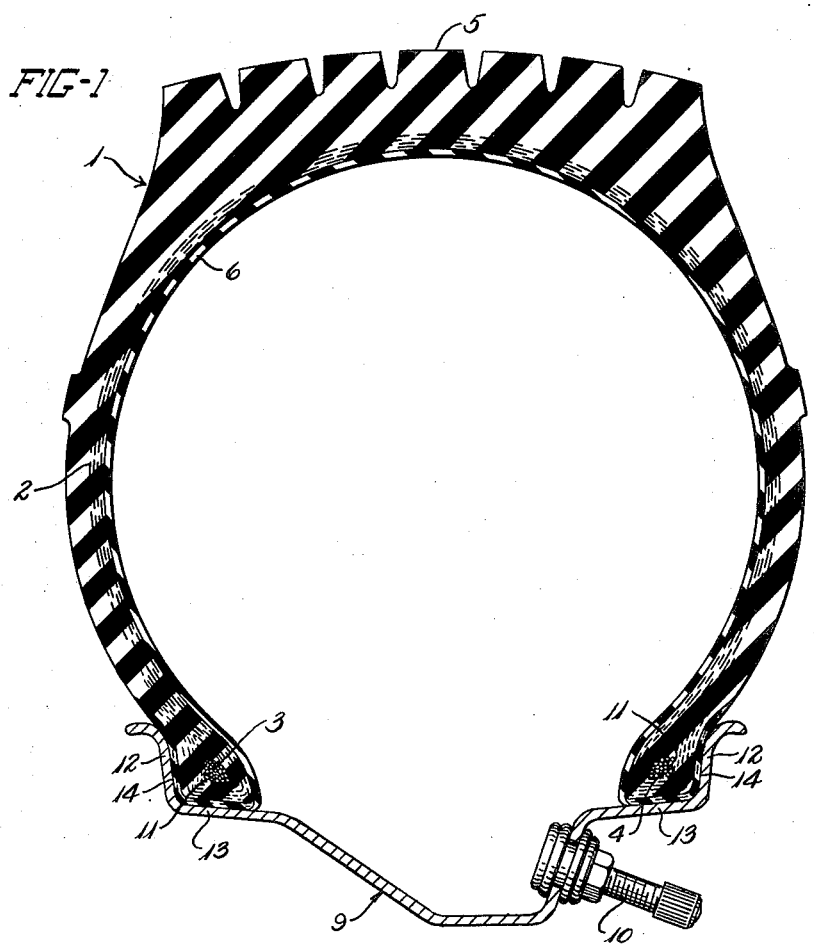
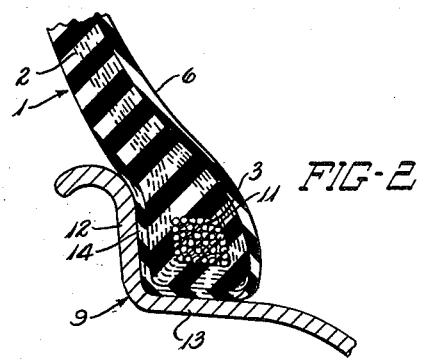
INVENTOR.
ROBERT C. KOCH
BY W. A. Fraser
ATTY.

Sept. 22, 1959     R. C. KOCH     2,905,222
TIRE CHAFER

Filed Aug. 9, 1955     2 Sheets—Sheet 2

INVENTOR.
ROBERT C. KOCH
BY
W. A. Fraser
ATTY-

United States Patent Office 2,905,222
Patented Sept. 22, 1959

2,905,222

TIRE CHAFER

Robert C. Koch, Akron, Ohio, assignor to The Firestone Tire & Rubber Company, Akron, Ohio, a corporation of Ohio Application August 9, 1955, Serial No. 527,231

5 Claims. (Cl. 152—362)

This invention relates to means for making pneumatic tires resistant to the escape of contained air. More particularly the invention relates to a novel rubbery composition and method for preventing the escape of air from the tire along the individual cords of the fabric chafer.

The development of pneumatic tires has led to a tire designed to hold air without an inner tube. The load-supporting air pressure in such a tire is contained by an air-impervious body obviating the bulky and expensive inner tube with attendant hot running of the tire during road service. To prevent the escape of air from such a tubeless tire, the inside surface of the inner wall of the tire cavity from bead to bead is provided with an inner liner of a rubbery air-impervious material usually comprising Butyl rubber alone or in combination with other rubber or plastic materials. To make a tubeless tire air-tight, it is necessary that special precautions be taken in the make up of the bead to prevent the escape of air from inside the tire casing as the bead is chafed and cut by the rim flange during road operation. Experience has shown that bead constructions satisfactory for retaining air in thin ply tubeless passenger tires operating at relatively low contained air pressures are not satisfactory for tubeless truck tires operating at higher contained air pressure.

The present invention provides a chafer of air-impervious fabric for a tubeless tire.

It is therefore an object of this invention to provide means for retaining air in a pneumatic tire.

It is also an object of the invention to provide an improved air-impervious fabric chafer for a tubeless truck tire.

It is a further object of the invention to provide a method of making fabric impervious to air.

A further object of the invention is to provide a rubbery neoprene composition using large amounts of softener with an aromatic solvent which will penetrate fabric cords to protect such cords from the infiltration of air.

A further object of the invention is to provide an air-impervious cotton chafer element for a tubeless tire.

These and other objects will become apparent with reference to the following specification, claims and drawings of which;

Fig. 1 is a fragmentary perspective view partially in section of a tire embodying the invention.

Fig. 2 is an enlarged fragmentary sectional view of a tire bead embodying the chafer element of the invention.

Figure 3:
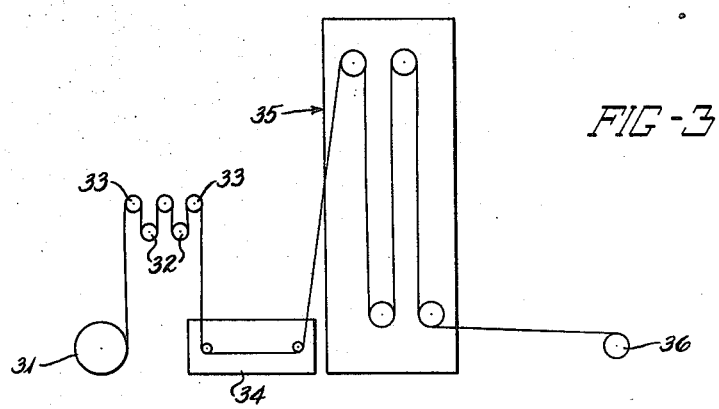
Fig. 3 is a schematic diagram of the apparatus used in practicing the invention.

Although the present invention is designed primarily for use in large multi-ply tires operating at contained air pressures above the normal passenger tire air pressures of 24 p.s.i., the advantages of the invention are adaptable to all pneumatic tubeless tires.

With reference to Fig. 1, tire 1 is comprised of a multi-ply fabric body portion 2 terminating at its edges in inextensible bead portions 3 and 4 and capped with an abrasion-resistant tread portion 5. An inner liner portion 6 is adhered to the innermost ply of fabric body portion 2 and extends from the toe 7 of bead portion 3 around the inner wall of the air containing cavity and terminates at the toe 8 of bead portion 4. Inner liner 6 preferably, is comprised of an air-impervious rubbery material such as Butyl-type rubber or mixtures of such rubber with other rubbery or plastic materials. Tire 1 is mounted for road operation on rim 9 which is provided with a valve 10 for the introduction of air into the air cavity defined by rim 9 and tire 1.

Fig. 2 is an enlarged section of bead 3 showing the construction of the fabric body plies 2 around bundle of bead wires 11. Bead 3 is supported against movement axially of the rim by rim flange 12 and supported radially by bead seat 13. During rotation of the tire during vehicle operation, deflection of the tire contacting the road causes the bead to rub against both the flange 12 and against the bead seat. This abrasive action eventually wears through the rubber and often exposes the fabric plies of body 2. To protect the ply fabric of body 2 from such abrasive action, it is customary to cover the bead with a rubberized square woven fabric chafer element 14. The chafer element 14 may be comprised of one or more plies and in a conventional tire no precautions are necessary to make the fabric chafer plies impervious to the passage of air. However, in tubeless tires and particularly in tubeless truck tires, high air pressure in the body cavity forces air against and under the tire bead and if the chafer fabric is not impervious to the passage of air, each individual cord will serve as a pipe to conduct air out of the air cavity into the body of the tire or to the outside atmosphere thereby reducing the internal load supporting air pressure of the tire or causing the tire body to disintegrate.

In the present invention this difficulty is overcome in that each individual chafer cord is made impervious to the passage of air, by a composition comprised of rubbery polychlorobutadiene dissolved in a quantity of suitable solvent to form a cement. Such a cement is allowed to penetrate the individual cords of the fabric to impregnate them with a rubbery thickness of air-impervious material.

The rubbery composition of the invention is a low viscosity high solids cement comprised of rubbery polychlorobutadiene known commercially as neoprene [1] and using significant amounts of plasticizer. Sheets of cotton tire cord fabric are soaked in such a cement for a period of time necessary to impregnate each cord. By using such a low viscosity cement, penetration will be deep within the cord while the rubbery content of the cement will form a coat to exclude air. The novel neoprene composition of the invention will not bleed out of the cord after the dipping operation as the cord is dried. The treated fabric is dried to remove the solvent; faced with a sheet of rubbery material by calendering in the conventional manner and cut to desired size for use as a chafer of a tire.

Figure 4:
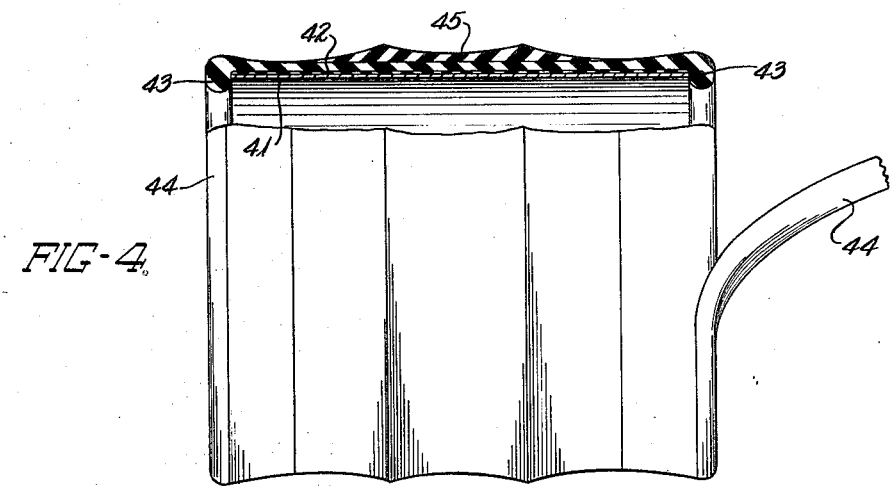
Fig. 4 is a front elevation of a tire building drum mounting a semi-finished tire and showing the position of the novel chafer of the invention during tire building.

As shown in Figure 4, an unvulcanized truck tire band is built up by plying-up lengths of rubberized fabric in a conventional manner with bead elements at each edge. The impregnated chafer fabric is applied over the bead covering an area from the toe thereof to a point well above that part of the bead portion which engages the ---
[1] Manufactured and sold by the E. I. du Pont de Nemours & Company, Wilmington, Delaware.

rim flange when the tire is mounted on a wheel. Tread and sidewall portions are applied over the body and the band is shaped and vulcanized to provide the finished vulcanized tire. The tire may be mounted on the wheel, and tire cavity filled with air under pressure through valve 10 and as the wheel rotates and the rim flange 12 and bead seat rubs the bead portion and exposes the fabric, no air will enter and seep along the cords.

In practicing the invention, a strip of square woven cotton fabric was soaked with the low viscosity high solids content neoprene cement to make the individual cords impervious to air. A 9.00-20 truck tire was built using the air-impervious fabric in the chafer. The bead of the finished vulcanized tire was buffed with a wire buffing wheel to lacerate the cords of the chafer and expose them to the load-bearing air pressure of the tire. The tire was mounted on an indoor test wheel and inflated with air at a pressure of 75 p.s.i. and run for 9,000 miles at a speed of 45 m.p.h. without significant loss of air. As a control, a pneumatic truck tire built in the same manner but without the impervious chafer was tested on the same test wheel at the same speed and inflation. The tire failed from separations which appeared between the sidewall and the outer fabric ply of the tire due to escape of the air through the fabric cords of the chafer into the interface of the fabric body and the sidewall. The novel chafer provided an improvement over the conventional chafer in these tests.

In the preferred modification of the invention, a compound having the following formulation was mixed in the conventional manner:

| | |
|---|---:|
| Neoprene [1] | 100 |
| Carbon black | 2 |
| Zinc oxide | 5 |
| Magnesium oxide (light calcinated) | 4 |
| Accelerator | 1 |
| Phenyl beta naphthyl amine | 3.0 |
| Plasticizer | 20.0 |
| | 135.0 |

[1] Preferably Neoprene GN sold by the E. I. du Pont de Nemours & Company, Wilmington, Delaware.

The final stock was dissolved in an aromatic solvent to a total solids content of about 30% by weight. Examples of commercially available mineral oils useful in the invention include mineral oils such as Paraflux,[2] pine tar, rosin as well as synthetic plasticizers such as tributoxy ethyl phosphate and the like. Particularly good results have been obtained with mineral oil and tributoxy ethyl phosphate. The plasticizer loading may be from 15 to 35 parts by weight of rubber hydrocarbon with 20 to 25 parts being preferred.

Among the known solvents useful for making the neoprene cement of the invention are aromatic solvents such as benzene, toluene, xylene and their homologues; ethylene dichloride, trichloroethylene, and other chlorinated hydrocarbon solvents; ester solvents, such as amyl acetate, butyl formate, butyl acetate, ethyl acetate and ethyl propionate; ketones, such as methyl ethyl ketone, isophorone and the like; mixtures of any of the above solvents with each other or with gasoline or the like; and commercial mixed solvents for neoprene known to the art.

The neoprene and pigments in the above formulation may be mixed on an open roll mill or in an internal mixer and the rubbery stock obtained dissolved in a suitable solvent in sufficient quantity to yield a cement with a total solids concentration of 25-40% by weight and preferably about 30% by weight. The fabric must be soaked for at least 10 minutes and may be soaked as long as 30 minutes or longer but preferably for about 20 minutes. Soaking even longer than 30 minutes will not harm the fabric and retain the benefits of the invention if the cement is kept slightly agitated and the fabric is immediately cleared of excess cement when it is removed from the soaking tank. After the fabric is removed from the cement tank, it is dried slowly until the solvent is removed, usually at least 30 minutes and as much as or even more than an hour at a relatively low drying temperature. Temperatures of from 70° F.–180° F. are preferred. Very rapid drying is to be avoided since very high temperatures remove the solvent from the innermost parts of the cord before the rubbery material has penetrated the cord fibers. For example, accelerated drying for 10 minutes at a temperature of 212° F., although removing the solvent does not produce a fiber cord which is impervious to passage of air.

Figure 5:
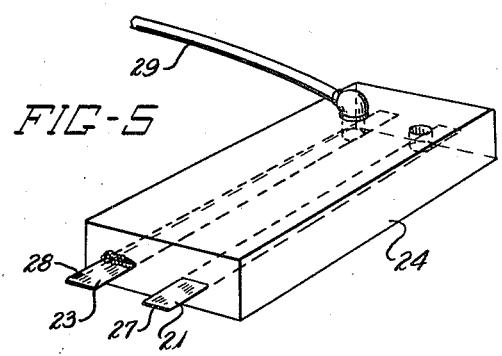
Fig. 5 is a perspective view of apparatus for testing the air-impervious character of fabric.

To test the air-impervious character of fabric, a strip 21, treated in the novel manner was laid on a quarter inch thick layer 22 of unvulcanized rubber (Fig. 5) beside an untreated strip 23. A second one quarter inch thick layer of unvulcanized rubber 24 was placed on the fabric test strips sandwich fashion and the rubber pressed and vulcanized between the platens of a vulcanizing press to form a pad. A small strip of rubber was removed from the vulcanized rubber layer to expose the cords of each test strip 21 and 23 for a distance of about one half inch from the edge of the pad. Soap solution was applied to the cord ends 27 and 28 at the edge of the pad and the nozzle 29 of an air hose connected to an 80 p.s.i. air line was pressed against the exposed fabric and air released (Fig. 5). Seepage of air through the cords of the fabric was noted by the rise of soap bubbles on the ends of cord at the edge of the pad. The fabric strip soaked in the novel manner allowed no air seepage with formation of bubbles while the untreated strip allowed air seepage with formation of bubbles at its cord ends at the edge of the pad.

Apparatus for practicing the invention is shown in Fig. 3 wherein a fabric letoff roll 31 pays out fabric which is drawn over a number of conventional idler rolls 32 and drive rolls 33, through one or more dip tanks 34 depending on the number of soakings used with the neoprene cement and through one or more conventional drying units 35 to evaporate the solvent and finally to a windup roll 36 where the air-impervious fabric is wound into a roll. Although the apparatus and method of Fig. 3 as has been described is appropriate for treating either weftless or square woven fabric, it is to be understood that the invention applies equally as well to single cords which may be later woven into fabric.

The fabric provided by the apparatus of Figure 3 is rubberized by calendering in the conventional manner and cut into strips of desired width to provide an unvulcanized tire chafer strip.

In building a tire using the novel chafer, a sheet of rubbery air-impervious inner liner material 41 is wrapped around the drum 42 of a tire building machine (Fig. 4) and additional rubberized plies of conventional truck tire fabric are wrapped around the drum to build up the body portion of the tire. Inextensible bead elements 43 are placed at each edge of the fabric plies which are turned up or turned down to secure the body to the bead. Chafer strips of air-impervious fabric 44 prepared as described above are wrapped around the bead as shown and firmly stitched to the body plies in the bead area. A length of rubbery tread material 45 is applied over the outer-most ply in the approved fashion and the resulting unvulcanized tire removed from the tire building machine and vulcanized in a suitable manner. The finished tire is now capable of supporting a load and operating at high speeds for long periods of time without loss of air by seepage through the cords of the chafer.

Although, conventionally, tire fabric is dipped in solvent or dispersion type dips to improve the adhesiveness of fabric to rubber, the present invention goes farther by embracing the soaking of fabric in the dip or the repeated dipping of the fabric until each cord is saturated or made air-impervious. The term "saturated" is used in describ-

[2] Petroleum residue sold by C. P. Hall Company, Akron, Ohio.

ing the condition of the cords of the invention wherein they are impervious to the passage of air under the conditions of the test described and shown in Figure 5.

The invention applies particularly to cotton cord and to truck tire chafers fashioned from square woven cotton cord fabric. However, the invention is not to be limited to cotton but includes fabric made of rayon, nylon, Dacron, or other synthetic fibers.

Invention is not intended to be limited to the examples set forth but only to the extent of the following claims read in view of the prior art.

I claim:

1. An inflatable tubeless tire comprised of a hollow annular body of resilient rubbery material open at the radial inner portion and having beads at the inner periphery thereof adapted to seat on a rim so that the tire and rim form an air chamber, each of said beads having a sheet of cords imbedded in and completely surrounded by the rubbery material of the tire and folded around and positioned in close proximity to the surfaces of the bead which engage the bead seat and rim flange of the rim, each said cord having interstices whereby in the untreated condition it is normally pervious to air along its length and terminating at one end at a location adjacent to the toe portion of a bead and at the other end at a location adjacent to a sidewall of the tire to form support for the surfaces of a bead resting on the rim, said interstices being completely saturated with a rubbery composition comprised of rubbery polychloroprene polymer and from 15 to 35 parts per 100 parts of polymer of a plasticizer compatible with said polymer, whereby air is prevented from escaping from said air chamber along the cords to deflate and injure the tire.

2. A tubeless tire according to claim 1 wherein the plasticizer is a mineral oil.

3. A tubeless tire according to claim 1 wherein the plasticizer is a liquid hydrocarbon.

4. A tubeless tire according to claim 1 wherein the plasticizer is tributoxy ethyl phosphate.

5. A tubeless tire according to claim 1 wherein the plasticizer is a low boiling petroleum residue.

References Cited in the file of this patent

UNITED STATES PATENTS

| | | |
|---|---|---|
| 2,000,869 | Taylor | May 7, 1935 |
| 2,131,636 | Nellen | Sept. 27, 1938 |
| 2,415,541 | Soday | Feb. 11, 1947 |
| 2,422,002 | Elwell et al. | June 10, 1947 |
| 2,541,550 | Sarbach | Feb. 13, 1951 |
| 2,592,844 | Antonson | Apr. 15, 1952 |
| 2,601,394 | Hansen | June 24, 1952 |
| 2,615,826 | Mallory | Oct. 28, 1952 |
| 2,628,945 | Wayne | Feb. 17, 1953 |
| 2,673,170 | Alstadt et al. | Mar. 23, 1954 |

FOREIGN PATENTS

| | | |
|---|---|---|
| 570,919 | Great Britain | July 27, 1945 |